United States Patent [19]

Ulrich et al.

[11] Patent Number: 4,755,368

[45] Date of Patent: Jul. 5, 1988

[54] SILICA FILLERS FROM SILICON POWDER

[75] Inventors: Gael D. Ulrich, Durham; Dennis W. Molesky, Newmarket, both of N.H.

[73] Assignee: Ulrich Research & Consulting, Inc., Durham, N.H.

[21] Appl. No.: 878,590

[22] Filed: Jun. 26, 1986

[51] Int. Cl.⁴ ............................................. C01B 33/12
[52] U.S. Cl. ...................................... 423/337; 419/23; 423/335
[58] Field of Search ................... 423/337, 335; 419/23

[56] References Cited

U.S. PATENT DOCUMENTS

| 2,535,659 | 12/1950 | Wolff | 423/337 |
|---|---|---|---|
| 2,545,896 | 3/1951 | Pipkin | 431/360 |
| 2,626,874 | 1/1953 | Pipkin | 423/337 |
| 3,363,981 | 1/1968 | Butler | 423/337 |
| 3,672,832 | 6/1972 | Ituml et al. | 423/337 |
| 4,054,641 | 10/1977 | Carman | 423/337 |
| 4,067,954 | 1/1978 | Volling | 423/337 |

OTHER PUBLICATIONS

Cab O Sil in Coatings, Cabot Corporation, U.S.A.
The Chemical Process Industries, Shreve, McGraw-Hill Book Company, Inc., New York 1945, pp. 237 and 219.

Primary Examiner—John Doll
Assistant Examiner—Lori S. Freeman
Attorney, Agent, or Firm—Andrew F. Kehoe

[57] ABSTRACT

A process for formation of a silica filler product comprising the steps of subjecting fluidized silicon powder to combustion at a temperature of about 3000° K. and quenching the combustion products to form a silica powder characterized by a large proportion of discrete, non-agglomerated primary particles.

9 Claims, 3 Drawing Sheets

FIG. I

SILICA FILLERS FROM SILICON POWDER

BACKGROUND OF THE INVENTION

This invention relates a method for producing a silica filler by direct combustion of silicon powder.

Silica fillers are well known in the prior art for use as pigments, reinforcing agents and the like. Commercially-available silica and other metal oxides are often derived from burning volatile metal halides with various fuels and oxidants. A survey of such technology is contained in an article entitled 'Flame-generated Fine Particles' appearing in Chemical and Engineering News, Pages 22-27 on Aug. 6, 1984. Also in other processes, electrical energy is used in forming silica powder. For example, silica can be formed in electrically induced plasmas, and silica can be formed by the reduction of sand by carbon in a electric furnace. In the latter process, silicon monoxide flows from the electrically-heated furnace and then is burned to form a silica powder product.

Silica has been formed by burning silicon powder. Pipkin, in U.S. Pat. Nos. 2,545,896 and 2,626,874 discusses the burning of silicon powder in an unsuccessful attempt to form a suitable diffusive coating on the interior of electric light bulbs. It is believed that no one successfully has burned silicon in a flame to form a commercially-desirable silica useful as, for example, a filler and in ceramics.

Other patents descriptive of the formation of $SiO_2$ include U.S. Pat. No. 2,535,659 to Wolf; U.S. Pat. No. 3,363,981 to Butter; U.S. Pat. No. 3,672,832 to Hulm et al and U.S. Pat. No. 4,054,641 to Carman et al.

The present inventors have addressed the problem of making silica powder from silicon powder.

SUMMARY OF THE INVENTION

A principal object of the invention is to provide a process for forming a commercially-valuable silica filler from silicon metal power.

Another object of the invention is to provide a process means to burn silicon powder to form a filler of good color.

Another object of the invention is to provide a silica filler of particular advantage in ceramics technology.

A further object of the invention is to provide a highly-disagglomerated silicon powder.

Still another advantage of the invention is to provide an economical process for making silica powder.

An other object of the invention is to make a very small silica powder of spherical shape.

Other objects of the invention will be obvious to those skilled in the art on their reading of this disclosure.

The above objects have been substantially achieved by the controlled oxidation of silicon powder in a flame at about 3000° K. The maximum localized flame temperature of the reaction is believed to approach 3200° K. The silicon powder, it is believed, is rapidly converted at the very high temperature to silicon monoxide (SiO) gas. The gas is further oxidized to silicon dioxide ($SiO_2$) liquid droplets which are then rapidly cooled or "frozen" to form minute silica particles. These minute particles are characterized by good color, i.e. characterized by white rather than gray appearance, and a spherical shape. They find use as fillers in a variety of resins including polyester resins, silicone resins, polyurethane resin systems and varnishes and coatings of many types. These materials are also particularly useful in glazing ceramic articles and other uses in the ceramic industry.

There are numerous advantages to using silicon metal as a raw material in silica production. For example, transportation and storage is both safer and cheaper than for such materials as the halogenated silanes. Also, the capital and operating costs of a silicon burning installation are less than for a silane and electrically-fired installation.

The process described below achieves approximately a 100% conversion of silicon powder to silica. It is believed particularly advantageous to fluidize the silicon powder with the oxidant and any auxiliary fuel and then feed the silicon, thus premixed, into the burner for combustion. It has also been found convenient to present a sieved fraction of silicon metal to the flame, avoiding larger particles. It is advantageous to use the silicon particles less than about 100 microns in average diameter. Particles of 50 microns and smaller are preferred in some processing equipment.

Although applicants do not wish to be bound by any theory of the specific kinetics of the present process, it is presently believed that silicon powder is oxidized to SiO gas which then is further oxidized to $SiO_2$ liquid which freezes to $SiO_2$ powder. It is believed that particle attraction is inhibited during the latter stages of growth by electrical repulsion, possibly because of ion absorption by the particles at the extremely high temperatures involved in the process.

The powder illustrated in FIG. 1 represents one unique product achievable with the procedure of the invention: discrete, ultra-small particles of almost perfectly spherical shape and of an average size of about 0.1 micron in diameter. The particular particle size and shape can be modified by quench rate and conditions such as temperature in the residence-chamber or, as will be seen in the method illustrated below, a further quench zone beyond a primary, or conventional residence-chamber.

ILLUSTRATIVE EMBODIMENT OF THE INVENTION

In this application, there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 1:
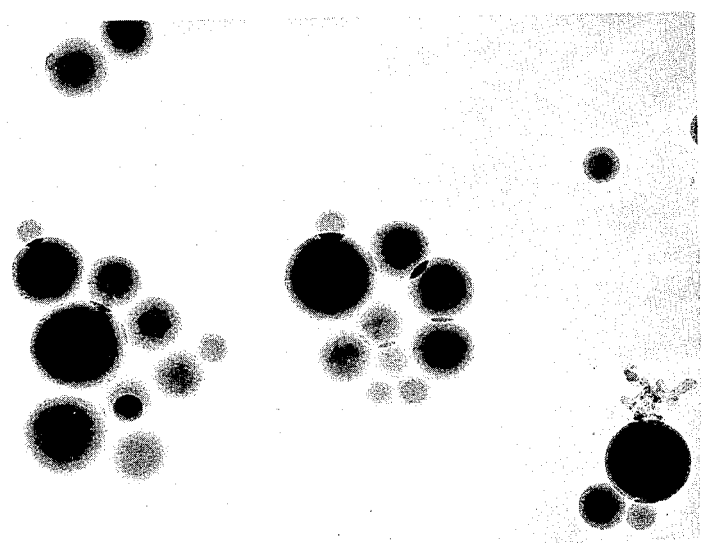
FIG. 1 is a photomicrograph showing particles prepared by the process enlarged by 100,000 diameters.
Figure 2:
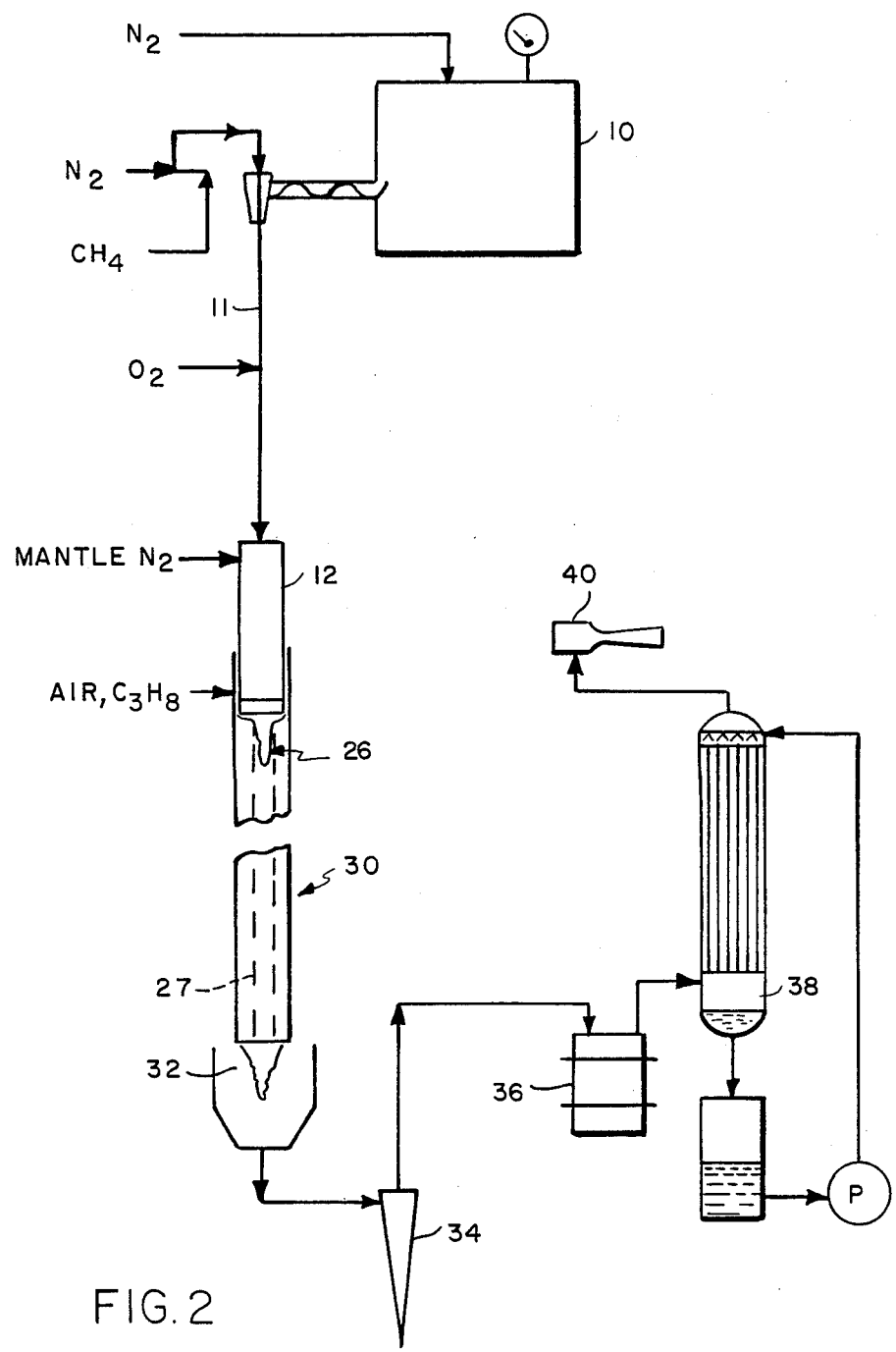
FIG. 2 is a schematic diagram of the process.

FIG. 2 illustrates a processing scheme wherein mechanically crushed, metallurgical-grade silicon powder, all of which passed through a 325-mesh classification screen (nominal opening of about 44 microns), is supplied from a auger-type powder feeder 10 at the rate of 1.5 milligram moles (mgmole) per second. The powder feeder is operated under an inert gas blanket of nitrogen (e.g., as maintained by a 0.015 mgmole/second gas feed rate).

Carrier nitrogen (0.9 mgmole/second) and methane gas (0.3 mgmole/second) are used to fluidize and convey the silicon powder from the feeder into feed line 11 toward the burner. The methane acts as an auxiliary fuel and appears to have some beneficial effect in smoothing the combustion process in the apparatus described. A quantity of oxygen (2.0 mgmoles/second) is fed into the fluidized powder as it approaches the burner 12.

Figure 3:
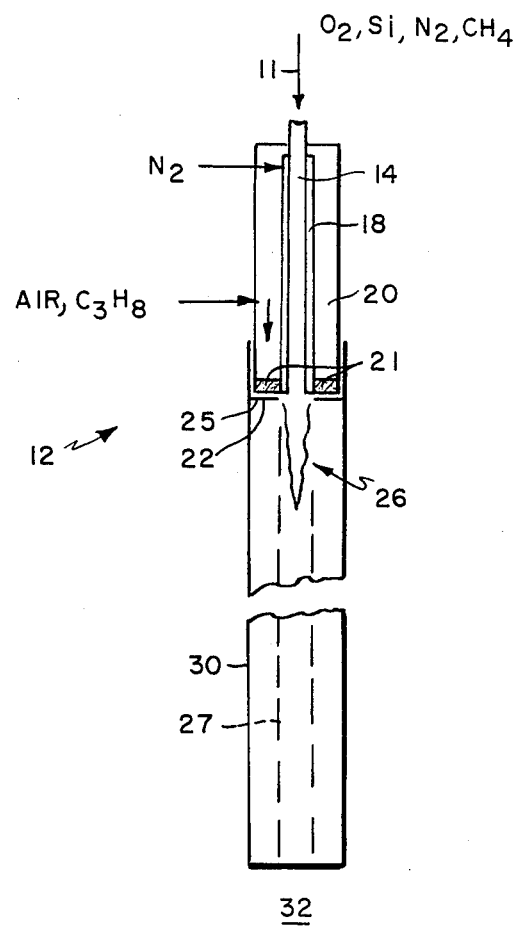
FIG. 3 illustrates one burner arrangement used to produce the powder of the invention.

As seen in FIG. 3, the burner 12 comprises a central tube 14, 4.5 mm in inside diameter, in which oxygen, silicon metal powder and carrier nitrogen and methane are conveyed. The core tube 14 (about 11 centimeters long) discharges into a residence chamber 30. Around core tube 14 is a concentric annular passage IS about 2 mm wide and 11 mm in outside diameter through which a protective mantle of an inert gas, e.g., nitrogen, argon, helium or the like, is caused to flow (at 0.4 mgmoles per second) downwardly around core tube 14.

A guard flame mixture, caused by the combustion of propane (0.34 mgmole/second) and air (4.4 mgmole/second) is formed in an outer combustion chamber 20. A porous stainless steel mesh structure 21 anchors the guard flame. The purpose of the guard flame in the illustrated burner is to ignite and then stabilize the principal flame and reduce heat-loss in the illustrated apparatus. The guard flame also acts to provide a longer, high-temperature, silicon-oxidizing flame. A somewhat fuel-rich guard flame appears to be advantageous.

About the end of tubes 14, 18 and 20 is a stainless steel mesh 21 which helps to control the guard flame 25 at the upper perimeter 22 of the residence chamber 30 around the core flame 26. Dotted lines 27 indicate the approximate boundary between core flame and guard flame products in the residence-chamber 30 as both streams flow through it. The residence chamber 30 is 41 mm in diameter and about 40 cm long. The core flame 26 is characterized by great luminosity as the silicon powder is burned in the residence chamber 30.

Quench air, i.e. air at room temperature, is pulled from ambient and is introduced into a quench zone 32 and the material is collected in a cyclone separator 34. This air flow is controlled by the steam jet evacuation system which provides the slight vacuum required to obtain the quench air. It is desirable to utilize auxiliary dust-collectors such as a gravity-settler tank 36 and a gas scrubber 38 to remove other powder from the exhaust stream. The cleaned exhaust contains no noxious fumes as it leaves the stream jet ejector 40. Silica product produced by the aforesaid illustrated process is very white in appearance without the gray tone that would be attributable to any substantial residue of unburned silicon metal. The surface area of the product of the illustrated embodiment is about 40 square meters per gram of product. Particles have an average diameter of about 0.1 micron. Products of 30 to about 80 square meters per gram, however, have been prepared, and an even broader range of sizes can be prepared by suitable modification of the quench and residence-time parameters of the process.

The lack of aggregation of the primary particles is unusual. Most pyrogenic silica powder products are aggregates of small primary particles fused together in grape-like clusters. The powders of one-micron and smaller of the illustrated process appear to be essentially isolated spheres which, to the extent they are in contact one with the other, appear to be so held only by relatively weak surface forces. This feature remains even when the particles are very small, e.g., below 0.25 microns in diameter. This characteristic is particularly valuable in forming ceramic compositions of predictable packing characteristics.

It is also to be understood that the following claims are intended to cover all of the generic and specific features of the invention herein described and all statements of the scope of the invention which might be said to fall therebetween.

What is claimed is:

1. A process of making silica powder comprising the steps of feeding a fluidized silicon-powder into a combustion zone and oxidizing said powder therein to an oxide of silicon in a flame at a temperature about 3000° K. and then further oxidizing said oxide and condensing to $SiO_2$ powder.

2. A process of making silica powder comprising the steps of feeding a fluidized silicon-powder into a combustion zone, oxidizing said powder to SiO in a flame at a temperature about 3000° K., then forming $SiO_2$ liquid, and freezing said liquid to form $SiO_2$ powder.

3. A process as defined in claim 1 wherein said $SiO_2$ powder is formed of a non-agglomerated population of primary silica particles.

4. A process as defined in claim 2 wherein said $SiO_2$ powder is formed of a non-agglomerated population of primary silica particles.

5. A process as defined in claim 1 comprising the steps of maintaining a fuel-rich guard flame around a silica-producing flame as it leaves a burner and enters a residence chamber.

6. A process as defined in claim 2 comprising the steps of maintaining a fuel-rich guard flame around a silica-producing flame as it leaves a burner and enters a residence chamber.

7. A process as defined in claim 1 comprising the step of removing silicon particles of 100 microns and larger from said silicon before it is fed into said combustion zone.

8. A process as defined in claim 2 comprising the step of removing silicon particles of 100 microns and larger from said silicon before it is fed into said combustion zone.

9. A process for forming a silica powder comprising discrete particles, said process comprising the steps of oxidizing silicon powder in a flame at about 3000° K., causing silica particles, formed of the products of said oxidation, to become ionized to the extent that ion-repulsive forces on said particles interfere with agglomerate formation by collisions of said particles.

* * * * *

UNITED STATES PATENT AND TRADEMARK OFFICE
CERTIFICATE OF CORRECTION

PATENT NO.   : 4,755,368
DATED        : 5 July 1988
INVENTOR(S)  : Gael D. Ulrich and Dennis W. Molesky It is certified that error appears in the above—identified patent and that said Letters Patent is hereby corrected as shown below:

Column 1, line 47, cancel "silicon" and insert therefor -- silica --

Column 3, line 17, cancel "IS" and insert therefor -- 18 --

Column 4, line 11, cancel "0.25" and insert therefor -- 0.025 --

Signed and Sealed this

Nineteenth Day of December, 1989

Attest:

JEFFREY M. SAMUELS

Attesting Officer    Acting Commissioner of Patents and Trademarks